(12) United States Patent
Hellmann

(10) Patent No.: US 10,638,887 B2
(45) Date of Patent: May 5, 2020

(54) PRODUCT FOR FOAMING A LIQUID MILK COMPOSITION

(71) Applicant: Neil Christopher Hellmann, Johannesburg (ZA)

(72) Inventor: Neil Christopher Hellmann, Johannesburg (ZA)

(*) Notice: Subject to any disclaimer, the term of this patent is extended or adjusted under 35 U.S.C. 154(b) by 84 days.

(21) Appl. No.: 16/030,449

(22) Filed: Jul. 9, 2018

(65) Prior Publication Data

US 2018/0310771 A1    Nov. 1, 2018

Related U.S. Application Data

(63) Continuation of application No. 15/032,442, filed as application No. PCT/ZA2014/000062 on Oct. 30, 2014, now abandoned.

(30) Foreign Application Priority Data

Oct. 30, 2013 (ZA) .................................. 2013-08234
Dec. 18, 2013 (ZA) .................................. 2013-09586

(51) Int. Cl.
| | |
|---|---|
| *B65D 85/73* | (2006.01) |
| *A47J 43/27* | (2006.01) |
| *B01F 13/00* | (2006.01) |
| *B65D 85/80* | (2006.01) |
| *B01F 15/00* | (2006.01) |
| *B01F 3/04* | (2006.01) |
| *B01F 5/06* | (2006.01) |

(52) U.S. Cl.
CPC ........... *A47J 43/27* (2013.01); *B01F 3/04446* (2013.01); *B01F 5/0693* (2013.01); *B01F 13/0022* (2013.01); *B01F 15/00512* (2013.01); *B65D 85/73* (2013.01); *B65D 85/80* (2013.01)

(58) Field of Classification Search
USPC ........................................... 366/130; 426/130
See application file for complete search history.

(56) References Cited

U.S. PATENT DOCUMENTS

| 5,378,480 A | * | 1/1995 | Carieri ...................... A23L 2/54 |
| | | | 426/590 |
| 6,332,704 B1 | | 12/2001 | Gasser et al. |
| 2012/0251682 A1 | * | 10/2012 | Meyl ..................... A47J 31/547 |
| | | | 426/241 |

(Continued)

FOREIGN PATENT DOCUMENTS

| DE | 32 19 804 | 3/1983 |
| EP | 1 354 544 A2 | 10/2003 |

(Continued)

OTHER PUBLICATIONS

International Search Report, PCT/ZA2014/000062, dated Jul. 31, 2015.
Written Opinion, PCT/ZA2014/000062, dated Jul. 31, 2015.

*Primary Examiner* — Mark Halpern
(74) *Attorney, Agent, or Firm* — Young & Thompson

(57) ABSTRACT

A product is provided containing a single dose of foamed liquid milk composition for use in a beverage, the product including a disposable container with a single dose of the composition which, upon agitation of the container, is aerated, wherein the composition includes milk having a fat content of 0%-4%, a protein, an edible natural gum, and an additive.

10 Claims, 2 Drawing Sheets

(56) References Cited

U.S. PATENT DOCUMENTS

2014/0295030 A1* 10/2014 Downes ................ A23C 9/133
426/86
2017/0127694 A1* 5/2017 Clavier Manrique ......................
A23C 9/1512

FOREIGN PATENT DOCUMENTS

| EP | 1 362 799 | 11/2003 |
|----|-----------|---------|
| EP | 1 532 909 | 5/2005 |
| JP | 2007-210683 | 8/2007 |
| WO | WO 2012/012393 | 1/2012 |

* cited by examiner

PRODUCT FOR FOAMING A LIQUID MILK COMPOSITION

BACKGROUND OF THE INVENTION

This invention relates to a product including a disposable container for foaming a liquid milk composition and a foamable liquid milk composition for use with the product. More particularly this invention relates to a product for the production of a single dose of a foamed milk product for use in a beverage including water or as a ready to drink product.

The use of foam in beverages, particularly in cappuccinos and the like, is widely known. Consumers often prefer these foamed beverages to regular coffee. A wide variety of devices are known for foaming milk. These devices generally make use of a rod and a foaming element which a user actuates relative to a container in which milk is housed in order to foam the milk. Alternatively, electronic devices are used.

A survey of the prior art shows that in a broad context the foaming of a milk composition has been addressed whether by concentrating on the ingredients in the composition, or on the construction and dimensions of a container which is used for the purpose For example, EP 1354544 discloses a container having a liquid reservoir for holding foamable liquid, a foam generating member for generating foam and a separate foam chamber which delivers one portion of foam through an opening. A drawback of the container described in EP 1354544 is that the construction is complex and therefore expensive to produce. Furthermore, the container is bulky and is designed for repeated use and is therefore not conveniently sized for use at various locations. This document also refers to a device in U.S. Pat. No. 6,332,704 which requires vigorous and prolonged shaking. This degree of mechanical action can detract from ease of use.

A need exists for a foaming device that is convenient and compact, inexpensive and easy to use and which can rapidly provide enough foam for a single beverage with a minimum amount of effort. Additionally, a tendency for the foam to "stick" to the device should be minimized so that usage of the foam is facilitated.

An object of the invention is to address, at least partially, the aforementioned requirement.

SUMMARY OF INVENTION

The invention provides, in the first instance, a product containing a single dose of a foamed milk composition including a disposable container with an inner surface, an internal volume inside the container which is bounded by the inner surface, an opening to the volume, a single dose of a liquid milk composition inside the internal volume and a seal to seal the liquid milk composition inside the internal volume, wherein, upon agitation of the container, the liquid milk composition is aerated, causing the liquid milk composition to foam, the seal then being actuable to allow the foamed composition to be discharged from the container, wherein the container includes within, or exposed to, the volume at least one foam enhancing formation, and the composition includes, at least, milk having a fat content of 0%-4%, a protein, an edible natural gum, and optionally, at least one additive.

The foam enhancing formation may be provided in any suitable way. By way of example the foam enhancing formation may be provided by forming the body so that at least one region of the inner surface has a reduced cross-sectional area e.g. with an hour glass shape or with a plurality of inwardly projecting formations, or at least one foaming element exposed in the internal volume in which the liquid milk composition is housed so that upon agitation of the container, the liquid milk composition is repeatedly brought into contact with the foaming element, causing the liquid milk composition to foam.

The foam-enhancing formation may be a sieve or screen bounding at least part of the volume, or an agitating ball formed from wire or plastic, which is movable in the volume, through the composition, when the container is shaken.

The container may have a body which is formed from any suitable disposable material e.g. plastic, glass or a liquid-impervious paper.

The inner surface of the container may include a coat or film having a low coefficient of friction i.e. lower than the inner surface of the body of the container in order to facilitate the dispensing of the foamed milk composition from the container.

The milk may be treated using UHT treatment, HTST treatment, retort, autoclave sterilisation or the like in order to ensure that it has a long shelf life. Additionally or alternatively the milk may be treated with any suitable preservative.

The protein may be selected from the group containing rice protein, soy protein, whey protein, hydrolysed wheat protein or casein.

The edible natural gum may be selected from the group containing guar gum, alginate, carob gum and carrageenan. Preferably the alginate is sodium alginate.

The composition may include an additive of any suitable kind and may include one or more of a flavourant, an alcohol, a colourant, an acid modifier, a vitamin or a stimulant.

The flavourant may include chocolate, vanilla, mocha, cocoa, almond, honey, coffee, cherry or rum. This is not limiting.

The alcohol may be of any suitable kind e.g. whisky, rum, a liqueur.

The stimulant may be of any suitable kind e.g. caffeine or an energy supplement. The invention is not limited in this respect. Preferably the caffeine is in the form of liquid coffee.

The acid modifier may be selected from the group containing aspartame, alginic acid, sorbitol and mannitol.

The vitamin may be of any suitable kind e.g. vitamin B12. This is not limiting.

The liquid milk composition may also contain up to 20% cream having a fat content of between 20%-60%.

The liquid milk composition is present in a quantity which is sufficient to produce enough foam for a single beverage. In one embodiment of the invention, a single dose of a liquid milk composition comprises between 50 ml-250 ml of low fat or skimmed milk having a milk fat content between 0%-4%, 0.01 g-5 g protein, 0.01 g-1 g natural gum and optionally, at least one additive.

In use, the liquid milk composition may be foamed through any suitable aerating means e.g. whisking, shaking. This is not limiting.

It has been found that the effective and rapid foaming of the milk composition is readily achieved if the ratio R of the volume of the composition to the size of the inner volume of the container is 20%<R<100%. Thus the volume of the composition may be from 50 ml to 250 ml according to intended use and the inner volume of the container may be in the range of 100 ml to 500 ml. By way of example only, typical, suitable volumes for a milk or coffee concentrated composition are 60 ml of composition which is aerated in a container with an inner volume of 120 ml i.e. R=50%. The foam composition is then added to 150 ml of water resulting in 180 ml of a coffee drink with about 90 ml of foam.

Experimentation has shown that, preferably, 50%<R<80%. In another embodiment, a suitable volume for a foamed beverage to be consumed directly i.e. ready to drink includes 200 ml of composition and an inner volume of 330 ml i.e. R=60.6%.

The seal may be formed from any suitable liquid-impervious material e.g. plastic or paper. In an alternative embodiment of the invention the seal is in the form of a screw cap which is threadedly engaged with the container, overlying the opening. In another embodiment, the seal is integrally formed with the container and is movable, as required, relative thereto to seal, or open, the container.

The product may be heated in a microwave oven prior to, or after, agitation, in order to produce a warm foam.

BRIEF DESCRIPTION OF THE DRAWINGS

The invention is further described by way of example with reference to the accompanying drawings in which.

DESCRIPTION OF PREFERRED EMBODIMENT

Figure 1:
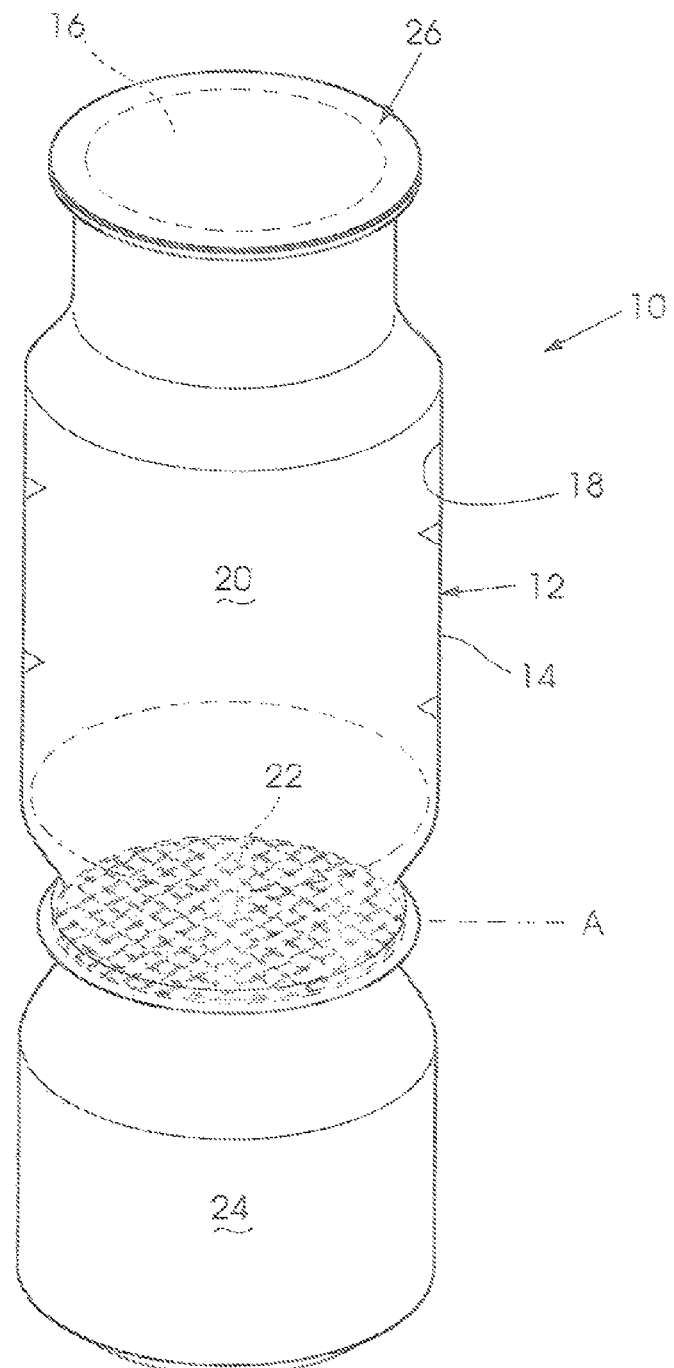
FIG. 1 is a perspective view of a product according to one embodiment of the invention.
Figure 2:
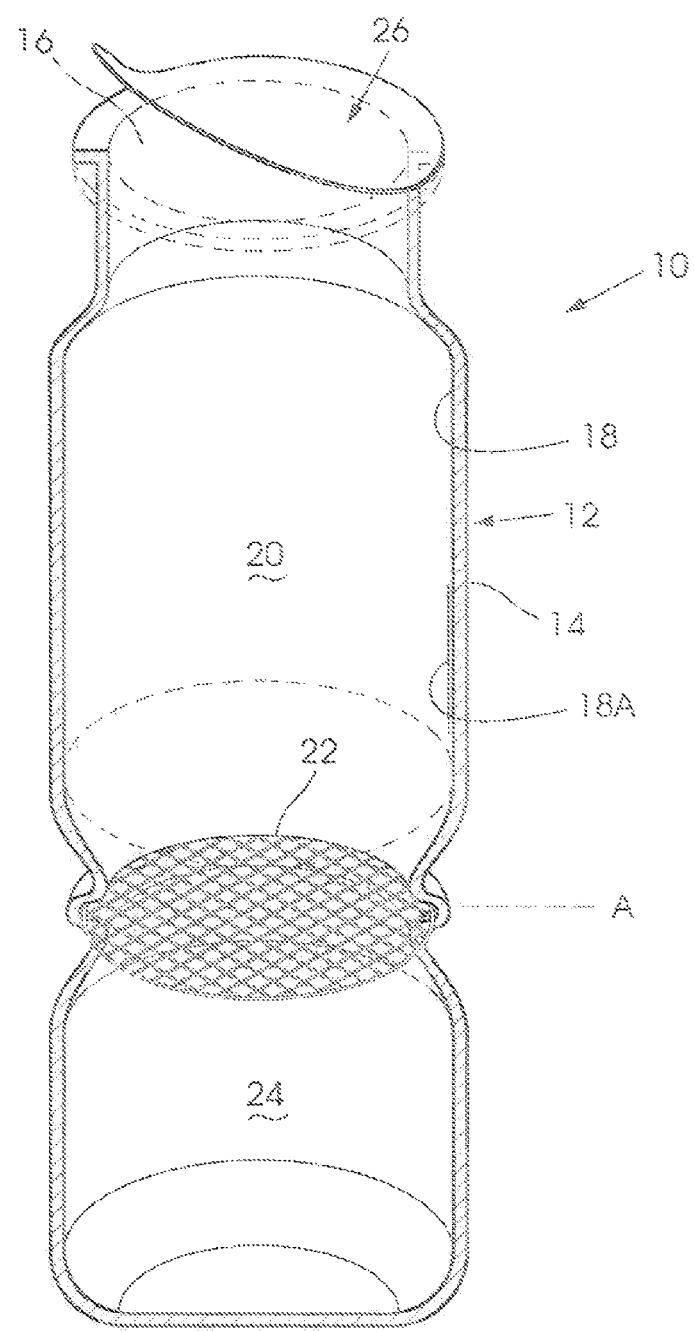
FIG. 2 is a cross sectional view of the product of FIG. 1.

FIG. 1 of the accompanying drawings shows a product 10 according to the invention which includes a container 12 having a body 14, an opening 16, an inner surface 18 of the body and an inner volume 20, as shown in FIG. 2.

A foam-enhancing element 22 (shown in FIG. 2 as a sieve), bounds at least part of the inner volume 20 of the body. A single dose of a liquid milk composition 24 fills at least part of the inner volume 20. A fluid-impervious seal 26 e.g. made from plastic, is removably engaged with the body 14 such that it bounds the opening 16.

The container 12 is disposable and it is therefore important that the body 14, foam-enhancing element 22 and seal 26 are formed from a light-weight disposable and inexpensive material. In a preferred embodiment of the invention, the container is formed from blow moulded or vacuum formed plastic. Alternatively the container may be formed from a water-impervious paper material. In another embodiment, the container is formed from a recyclable material e.g. glass.

The foam-enhancing formation, in one embodiment, comprises an inner surface which is shaped to be foam enhancing e.g. with an hour glass shape (as shown in FIG. 1) or with a plurality of inwardly projecting formations 28 (see FIG. 1). The foam enhancing formation also includes the foaming element (the sieve) 22 in the internal volume to which the liquid milk composition is housed so that upon agitation of the container, the liquid milk composition is repeatedly brought into contact with the foaming element, further causing the liquid milk composition to foam.

It has been found that the discharge of the foamed milk composition from the container can be facilitated by lowering the coefficient of friction of the inner surface 18 of the body. In this regard the inner surface has, applied to it, a coat or film 18A having a low coefficient of friction i.e. lower than the inner surface 18 of the body in order to facilitate the dispensing of the foamed milk composition from the container. This use of the low friction coat 18A is useful if the body is formed by a blow moulding technique for the surface 18 would then, normally, be fairly rough Alternatively the container is formed from a material e.g. glass which inherently has a low coefficient of friction—this allows the use of the film to be avoided.

The foaming formations (i.e. the element 22 and the hour-glass shape) act to aerate the milk composition 24 when shaken. In the illustrated embodiment the element is in the form of a grid or sieve having apertures through which the liquid can pass when the container is agitated. The sieve bounds at least part of the inner volume 20 to ensure that a maximum volume of the liquid flows through the apertures. The sieve is engaged with the internal surface of the body 14 with a friction fit to ensure that it remains in position during agitation of the container 12. Alternatively, the sieve is integral with the body.

Preferably the foaming element 22 is positioned in a lower 20% of the inner volume 20 of the body 14 as indicated by a line A in FIG. 2. This ensures that the flow of the foam produced from the liquid milk composition 24 is not obstructed when the foam is dispensed from the container 12.

In one embodiment the seal 26 is formed from a plastic or paper material. The seal extends across the opening 16 such that it forms a leak proof seal.

In another embodiment of the invention the seal is in the form of a screw cap (not shown) that is threadedly engaged with an outer surface of the body 14 of the container 12.

According to one aspect of the present invention the liquid milk composition comprises from 50% to 80% by volume of the internal volume of the container, preferably about 60%. This allows the liquid milk composition to fill a part of the internal volume to the extent that there is a sufficiently large volume of air inside the container such that when the container is agitated, the liquid milk composition is aerated producing a foamed beverage. For example if the volume of container is in the range of 100 ml to 500 ml, the ratio R of the volume of the composition to the size of the inner volume of the container is 20%<R<100%. More preferably, the ratio is 50%<R<80%.

In a preferred embodiment of the invention, the liquid milk composition has a volume of between 50 ml to 200 ml. In this embodiment, the liquid milk composition also includes a stimulant e.g. liquid coffee. This liquid milk composition may optionally include one or more additives e.g. a flavourant such as vanilla or chocolate.

The aforementioned dimensions ensure that the container is compact enough to be carried in a bag, purse or the like for use by a consumer, whilst still ensuring there is enough volume in the container to allow the liquid milk composition to flow freely upon agitation of the container. The disposable nature of the container also makes it convenient, as a user thereof does not have to carry the product around after use.

The milk composition, used in conjunction with the product, ensures that a maximum amount of foam is produced. In particular, the addition of the protein increases the ease of formation of the foam and also increases the foam stability. In a preferred embodiment, a single dose of the milk composition includes 0.01 g-5 g protein. The edible natural gum increases the viscosity of the foam and also acts as a stabilizer. Preferably, 0.01 g-1 g of natural gum is used in a single dose of milk composition.

It is envisioned that the product will be sold to consumers as a pre-packaged composition in various flavours according to a user's specific taste.

In use, a user agitates the product 10, causing the liquid milk composition to repeatedly contact the foaming element, thereby aerating it and producing a single dose of foam for consumption as a ready to drink product or for use with one beverage. The seal is then removed and the foam is poured from the opening for immediate consumption or into the beverage. Once the foam has been dispensed from the container, the container is thrown away.

The container and its contents can be heated prior to or after agitation to produce a warm foamed beverage.

The container may be constructed from a suitable material so that with its contents it can be heated in a microwave oven, or by immersion into boiling water (for example), without adversely affecting the container. In an alternative embodiment, the container is constructed from a suitable material so that with its contents it can be chilled e.g. in a freezer or the like to produce an iced beverage, without damage to the contents.

The invention claimed is:

1. A product containing a single dose of foamed liquid milk composition for preparing a beverage, the product comprising:
    a disposable container comprising an inner surface, an internal volume inside the container which is bounded by the inner surface, and an opening to the internal volume;
    a single dose of a liquid milk composition inside the internal volume, the liquid milk composition comprising milk having a fat content of 0%-4%, a protein, an edible natural gum, and at least one additive selected from the group consisting of a flavorant, an alcohol, a colorant, an acid modifier, a vitamin, and a stimulant; and
    a seal to seal the liquid milk composition inside the internal volume,
    wherein, upon agitation of the container, the liquid milk composition is aerated, causing the liquid milk composition to foam, the seal then being actuable to allow the foamed composition to be discharged from the container, and
    wherein the container includes at least one foam enhancing formation within, or exposed to, the volume.

2. The product according to claim 1, wherein the flavorant is selected from the group consisting of chocolate, cherry, vanilla, mocha, cocoa, almond, honey, coffee, and rum.

3. The product according to claim 2, wherein the container further comprises, applied to an inner surface of the body, a coat or film of a material having a coefficient of friction lower than the inner surface of the body.

4. The product according to claim 2, wherein the foam enhancing formation comprises at least one foaming element housed within the inner volume,
    wherein the at least one foaming element is a sieve or screen, and
    wherein, upon agitation of the container, the liquid milk composition is repeatedly brought into contact with the foaming element, causing the liquid milk composition to foam.

5. The product according to claim 1, wherein the stimulant is liquid coffee.

6. The product according to claim 5, wherein the container further comprises, applied to an inner surface of the body, a coat or film of a material having a coefficient of friction lower than the inner surface of the body.

7. The product according to claim 5, wherein the foam enhancing formation comprises at least one foaming element housed within the inner volume,
    wherein the at least one foaming element is a sieve or screen, and
    wherein, upon agitation of the container, the liquid milk composition is repeatedly brought into contact with the foaming element, causing the liquid milk composition to foam.

8. The product according to claim 1, wherein the container further comprises, applied to an inner surface of the body, a coat or film of a material having a coefficient of friction lower than the inner surface of the body.

9. The product according to claim 8, wherein the foam enhancing formation comprises at least one foaming element housed within the inner volume,
    wherein the at least one foaming element is a sieve or screen, and
    wherein, upon agitation of the container, the liquid milk composition is repeatedly brought into contact with the foaming element, causing the liquid milk composition to foam.

10. The product according to claim 1, wherein the foam enhancing formation comprises at least one foaming element housed within the inner volume,
    wherein the at least one foaming element is a sieve or screen, and
    wherein, upon agitation of the container, the liquid milk composition is repeatedly brought into contact with the foaming element, causing the liquid milk composition to foam.

* * * * *